United States Patent

Meyers et al.

(10) Patent No.: US 6,397,127 B1
(45) Date of Patent: May 28, 2002

(54) STEERING ACTUATED WHEEL LIFT IDENTIFICATION FOR AN AUTOMOTIVE VEHICLE

(75) Inventors: Joseph Carr Meyers, Farmington Hills; Todd Allen Brown, Dearborn, both of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/669,512

(22) Filed: Sep. 25, 2000

(51) Int. Cl.[7] ................................ B60Q 1/00
(52) U.S. Cl. .......................... 701/1; 701/2; 701/29; 701/124; 280/772; 280/689; 280/723; 340/431; 340/459
(58) Field of Search ................ 701/1, 38, 72, 701/78, 83, 45; 303/146; 340/440, 438, 461, 462

(56) References Cited

U.S. PATENT DOCUMENTS

| | | |
|---|---|---|
| 2,917,126 A | 12/1959 | Phillips |
| 3,608,925 A | 9/1971 | Murphy |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,809,183 A | 2/1989 | Eckert |
| 4,898,431 A | 2/1990 | Karnopp et al. |
| 4,964,679 A | 10/1990 | Rath |
| 4,976,330 A | 12/1990 | Matsumoto |
| 4,998,593 A | 3/1991 | Karnoop et al. |
| 5,089,967 A | 2/1992 | Haseda et al. |
| 5,224,765 A | 7/1993 | Matsuda |
| 5,335,176 A | 8/1994 | Nakamura |
| 5,408,411 A | 4/1995 | Nakamura et al. |
| 5,446,658 A | 8/1995 | Pastor et al. |
| 5,549,328 A * | 8/1996 | Cubalchini .................. 280/772 |

(List continued on next page.)

FOREIGN PATENT DOCUMENTS

| | | |
|---|---|---|
| DE | 36 16 907 | 11/1987 |
| DE | 38 15 938 | 11/1989 |

(List continued on next page.)

OTHER PUBLICATIONS

A Method For Reducing On–Road Rollovers—Anti–Rollover Braking, Thomas J. Wielenga, Dynamotive, L.L.C., International Congress and Exposition, Detroit, Michigan, Mar. 1–4, 1999.

Primary Examiner—William A. Cuchlinski, Jr.
Assistant Examiner—Tuan C To
(74) Attorney, Agent, or Firm—Gregory P. Brown

(57) ABSTRACT

A system for an automotive vehicle that includes a roll control system (16) and a wheel lift detector (20) is provided for an automotive vehicle (10). The automotive vehicle (10) has wheels (12) that when lifted from the road plane have less steering effort associated therewith. Preferably, each of the steered wheels (12) has a steering actuator (42) and an actuator sensor (30) for monitoring the steering effort. The load of the steering actuator (42) is monitored and the actuator (42) having the lightest load is determined. A steering perturbation is applied to the steering actuator and the steering effort is monitored during the perturbation. If the steering effort during the perturbation is lower than a lift threshold, then lift will be indicated. If the steering effort is greater than a lift threshold, then contact has been maintained with the road surface. In response to the indication of lift, corrective measures may be taken such as applying a counter steering effort or applying brakes in a predetermined fashion so as to counter the roll effect.

20 Claims, 1 Drawing Sheet

U.S. PATENT DOCUMENTS

| | | | |
|---|---|---|---|
| 5,610,575 A | 3/1997 | Gioutsos | |
| 5,634,698 A | 6/1997 | Cao et al. | |
| 5,640,324 A | 6/1997 | Inagaki | |
| 5,671,982 A | 9/1997 | Wanke | |
| 5,707,117 A | 1/1998 | Hu et al. | |
| 5,707,120 A | 1/1998 | Monzaki et al. | |
| 5,732,378 A | 3/1998 | Eckert et al. | |
| 5,732,379 A | 3/1998 | Eckert et al. | |
| 5,737,224 A | 4/1998 | Jeenicke et al. | |
| 5,742,918 A | 4/1998 | Ashrafi et al. | |
| 5,762,406 A | 6/1998 | Yasui et al. | |
| 5,782,543 A | 7/1998 | Monzaki et al. | |
| 5,809,434 A | 9/1998 | Ashrafi et al. | |
| 5,825,284 A * | 10/1998 | Dunwoody et al. | 340/440 |
| 5,857,535 A | 1/1999 | Brooks | |
| 5,869,943 A | 2/1999 | Nakashima et al. | |
| 5,890,084 A | 3/1999 | Halasz et al. | |
| 5,893,896 A | 4/1999 | Imamura et al. | |
| 5,931,546 A | 8/1999 | Nakashima et al. | |
| 6,002,974 A | 12/1999 | Schiffman | |
| 6,002,975 A | 12/1999 | Schiffman et al. | |
| 6,038,495 A | 3/2000 | Schiffman | |
| 6,065,558 A | 5/2000 | Wielenga | |
| 6,263,261 B1 * | 7/2001 | Brown et al. | 701/1 |
| 6,282,474 B1 * | 8/2001 | Chou et al. | 701/45 |

FOREIGN PATENT DOCUMENTS

| | | |
|---|---|---|
| DE | 43 21 571 | 1/1994 |
| DE | 42 27 886 | 2/1994 |
| DE | 42 28 893 | 3/1994 |
| DE | 43 35 979 | 4/1995 |
| DE | 196 02 879 | 8/1997 |
| DE | 197 51 867 | 5/1999 |
| DE | 197 51 891 | 5/1999 |
| DE | 197 51 925 | 5/1999 |
| DE | 197 51 935 | 5/1999 |
| DE | 198 02 041 | 7/1999 |
| DE | 199 07 633 | 10/1999 |
| DE | 197 51 839 | 5/2000 |
| EP | 0758601 | 2/1997 |
| FR | 24 25 342 | 12/1979 |
| GB | 2257403 | 1/1993 |
| GB | 2316455 | 2/1998 |
| JP | 57-6064 | 2/1982 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6312612 | 11/1994 |
| JP | 8080825 | 3/1996 |
| JP | 9005352 | 1/1997 |
| JP | 10024819 | 1/1998 |
| JP | 10278762 | 10/1998 |
| JP | 10329682 | 12/1998 |
| JP | 11011272 | 1/1999 |
| JP | 11170992 | 1/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |
| WO | WO99/30942 | 6/1999 |

* cited by examiner

STEERING ACTUATED WHEEL LIFT IDENTIFICATION FOR AN AUTOMOTIVE VEHICLE

TECHNICAL FIELD

The present invention relates generally to a dynamic behavior control apparatus for an automotive vehicle, and more specifically, to a method and apparatus for determining whether a wheel of an automotive vehicle has lifted from the pavement.

BACKGROUND

Dynamic control systems for automotive vehicles have recently begun to be offered on various products. Dynamic control systems typically control the yaw of the vehicle by controlling the braking effort at various wheels of the vehicle. By regulating the amount of braking at each corner of the vehicle, the desired direction of the vehicle may be maintained.

Typically, the dynamic control systems do not address roll of the vehicle. For high profile vehicles in particular, it would be desirable to control the rollover characteristics of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the body on a plane or nearly on a plane parallel to the road surface. Rollover control is used to maintain the vehicle wheels on the road surface.

Various methods have been proposed to determine whether roll is occurring. Typically, such systems include additional sensors from those of a dynamic stability control system. Therefore these systems are more expensive.

It would therefore be desirable to provide a rollover detection system having reduced costs and increased reliability in determining the presence of a rollover.

SUMMARY OF THE INVENTION

It is therefore one object of the invention to provide a rollover detection system that may be used in conjunction with the dynamic stability control system of the vehicle to determine rollover.

It is a further object of the invention to provide a rollover stability control system that provides steering correction in response to the detection of a potential rollover or wheel lift. The present invention provides a system for an automotive vehicle that includes a roll control system and a wheel lift detector is provided for an automotive vehicle. The automotive vehicle has wheels that when lifted from the road plane have less steering effort associated therewith. Preferably, each of the steered wheels has a steering actuator and an actuator sensor for monitoring the steering effort. The actuator sensor may be an implied sensor that monitors the drive current or pressure to monitor the load on the steering actuator. The load of the steering actuator is monitored and the actuator having the lightest load is determined. A steering perturbation is applied to the steering actuator and the steering effort is monitored during the perturbation. If the steering effort during the perturbation is lower than a lift threshold, then lift will be indicated. If the steering effort is greater than a lift threshold, then contact has been maintained with the road surface. In response to the indication of lift, corrective measures may be taken such as applying a counter steering effort or applying brakes in a predetermined fashion so as to counter the roll effect.

One advantage of the invention is that in vehicles employing a dynamic stability control system, additional sensors may not be required.

Other objects and features of the present invention will become apparent when viewed in light of the detailed description of the preferred embodiment when taken in conjunction with the attached drawings and appended claims.

BRIEF DESCRIPTION OF THE INVENTION

DESCRIPTION OF THE PREFERRED EMBODIMENT

The present invention is described with respect to a wheel lift identification system for an automotive vehicle. Those skilled in the art will recognize that the present invention may be incorporated into a rollover prevention system for an automotive vehicle.

Figure 1:
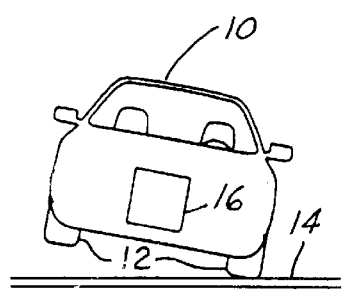
FIG. 1 is a partial cutaway view of an automotive vehicle having a wheel lift identification system according to the present invention.

Referring now to FIG. 1, an automotive vehicle 10 has a plurality of wheels 12, two of which are shown as elevated above a road plane 14. A roll control system 16 is included within vehicle 10. The roll control system 16 is used to counteract the lifting of wheels 12 from road plane 14 as will be further described below.

Figure 2:
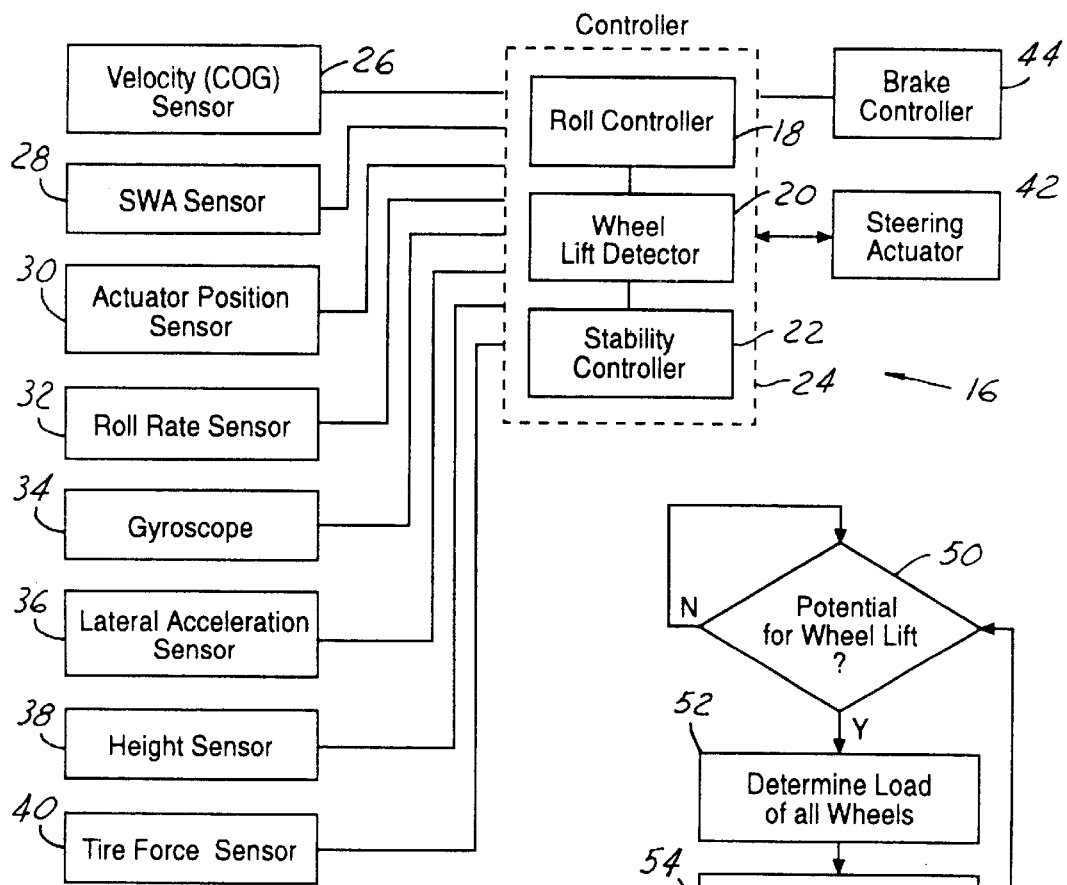
FIG. 2 is a block diagrammatic view of a wheel lift identification system according to the present invention.

Referring now to FIG. 2, a high level block diagrammatic view of a roll control system 16 according to the present invention is illustrated. Roll control system 16 has a roll controller 18, a wheel lift detector 20, and a stability controller 22. Although roll controller 18, wheel lift detector 20, and stability controller 22 are illustrated as separate components, those skilled in the art would recognize that these components may be contained in a multi-purpose controller 24. Preferably, controllers 18–22 are microprocessor based. Roll controller 18 is used to correct the tendency for a vehicle to roll over. Wheel lift detector 20 is coupled to roll controller 22 and indicates to roll controller 18 the presence of a lifting wheel which in turn is indicative of the potential for a vehicle to roll over. The wheel lift threshold may vary relative to the speed of vehicle 10. Stability controller 22 may be used to control various dynamic functions of the automotive vehicle based on the inputs from sensors. In a preferred embodiment of the invention, wheel lift detector 20 and roll controller 18 may be incorporated into stability controller 22 to form the multi-purpose controller 24.

The sensors for use in the rollover control system 16 includes a velocity sensor 26 that provides a velocity signal for the velocity at the center of gravity of the vehicle. Velocity sensor 26 may derive the velocity at the center of gravity of the vehicle from a velocity sensor located at each of the wheels. Various types of velocity sensors such as tooth wheel type may be employed as will be evident to those skilled in the art.

A wheel angle position sensor 28 is also included that provides the relative steering wheel angle of the hand wheel of the vehicle.

An actuator position sensor 30 may also be included that provides the position of the steered wheels (from the actuator position) and actuator effort of the actuators that control the steering for the vehicle. The actuator effort may be indicated by a current signal from a motor or a hydraulic pressure within the system. Preferably, in the preferred embodiment, at least the front two wheels have separate steering actuators. However, the present invention is equally applicable to systems having four wheel steering. In the case of four wheel steering, each wheel may have a separate actuator. The potential for wheel lift may be determined using velocity sensor 26, steering wheel angle sensor 28, and actuator position sensor 30.

Various sensors may be used to determine the roll status of the vehicle and thus, the potential for a wheel lift. For example, a roll 32 rate sensor that generates a signal indicative of the roll position of the vehicle. A gyroscope 34 generates a signal indicative of the position of the body of the vehicle.

A lateral acceleration sensor 36 provides a signal indicative of the lateral acceleration of the vehicle.

A height sensor 38 generates a signal corresponding to the relative height at various portions of the body of the vehicle.

A tire force sensor 40 generates a signal indicative of the force of the tires against the road surface.

The sensors 26–40 are illustrative of various types of sensors that may be incorporated to provide feedback to controller 24 as to the dynamic status of the vehicle. As those skilled in the art will recognize, the number and types of sensors may vary depending on the desired vehicle functions.

Each of the sensors is coupled to multipurpose controller 24 if the system is provided with one. Otherwise, the sensors may be individually coupled to roll controller 18, wheel lift detector 20, and stability controller 22.

Controller 24 of the individual controllers 18–22 may be coupled to a steering actuator 42. Steering actuator 42 controls the amount of steering at each of the steered wheels. Preferably, as mentioned above, a separate steering actuator 42 is provided for each wheel steering actuator 42 may be hydraulic, electric or a combination of the two. Steering actuator 42 may have actuator position sensor 30 formed therein.

Figure 3:
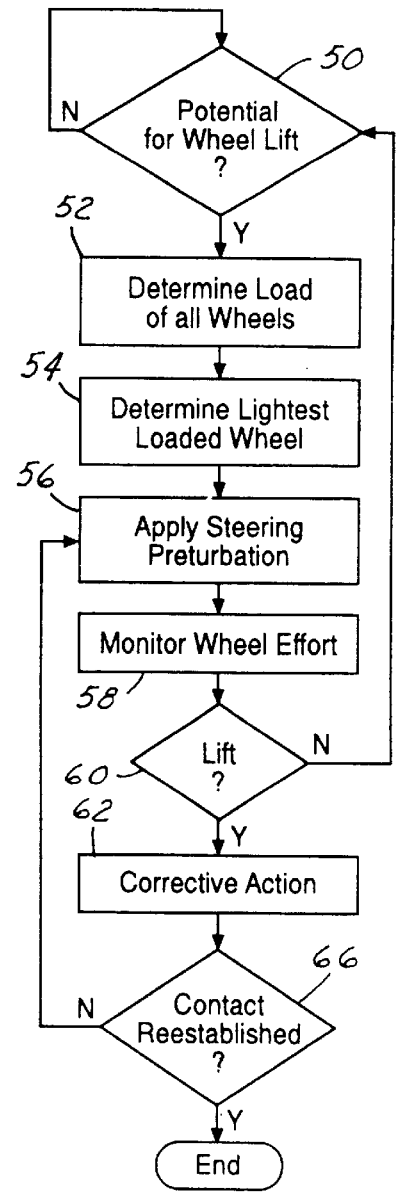
FIG. 3 is a flow chart of a wheel lift identification system according to the present invention.

Referring now to FIG. 3, a method for detecting wheel lift and controlling roll of an automotive vehicle is described. In step 50, a potential for wheel lift is determined. The potential for wheel lift may be determined by monitoring sensors 26–40 described above. Only a small number of sensors 26–40 may need to be used to predict the likelihood of wheel lift. For example, the velocity sensor 26, the steering wheel angle sensor and the actuator position sensor 30 may be used. Those skilled in the art will recognize that other combinations of sensors and other sensors may be used.

The system preferably continually monitors whether there is a potential for wheel lift in step 50. The primary detection of wheel lift is preferably performed by a roll control function. Based on the inertial sensors (speed, accelerations, yaw and roll rates, etc) or relative wheel speeds, the roll controller may estimate the tire normal loads and the vehicle roll condition. From these estimations the wheel lift detector indicates that a lift is suspected and which wheel or wheels is suspected. Preferably, a steering perturbation is used on a wheel if there is a very high confidence that the wheel is lifted. Further, the steer angle of a loaded wheel is also preferably not modified unless it is for a corrective action described below. However, during a steering event the actuator load on the steered wheels may be monitored and used to determine the normal loads on those wheels. Those values may be compared to the load seen due to the perturbation on the lifted wheel(s).

If a potential for wheel lift exists in step 50, step 52 is executed in which the steering load or effort of all the steered wheels is obtained. If the vehicle has a two wheel steering system, then the two steered wheels are used which are likely to be the front wheels. If the vehicle has a four wheel steering system, all four steering wheel loads may be used. In some systems such as a conventional front steering rack, the separate load on the individual wheels cannot be monitored but may be inferred. In step 54, the loads are monitored to determine the lightest loaded wheel. That is, if one of the steering loads of the wheel is less than a predetermined amount below the rest of the wheels. In step 56, a steering perturbation is applied to the wheel having the lightest load. Preferably, the perturbation is an amplitude difference in the steering wheel angle that allows the vehicle to increase the path of rotation. The perturbation is a slight change in the amplitude of the steering wheel effort for a predetermined amount of time. This predetermined amount of time is preferably relatively short. After the perturbation, the steering wheel is returned to its first location prior to the perturbation or to the angle appropriate for any steering wheel motion that may have occurred during the perturbation.

In step 58, the amount of effort to turn the steering wheel is monitored during the perturbation. The general principle of the present invention is that the effort to turn the steering wheel during a perturbation will be relatively low if the wheel is lifted. Therefore, the wheel effort is compared to a predetermined threshold in step 60 to determine whether the wheel has lifted. If the effort is above the predetermined threshold, no lift has been found and step 50 is re-executed. As mentioned above, the predetermined threshold is preferably speed dependent and steering angle dependent. That is, at higher speed, less effort is needed to turn the vehicle, i.e., steer the tires. In step 60 if lift is determined, corrective action may be taken. Also, an indicator such as a warning light or buzzer in the vehicle may also be generated. Corrective actions such as applying brakes or preferably applying a predetermined counter effort to the steering mechanism to counter the tendency to roll over is provided. That is, the loaded front wheel may be steered to an angle that would increase the vehicle's turning radius to an angle that would reestablish wheel contact. When a lifted wheel is detected, the steering effort is continually monitored to determine whether contact has been reestablished. If contact has not been reestablished, another perturbation is applied and steps 56 through 62 are again executed. If contact has been reestablished, then the process ends at step 66. Of course, those skilled in the art would recognize that this system preferably continually monitors the wheels and after step 66 may return to step 50.

In a further aspect of the invention, the process may also be used to confirm an estimate of the vehicle status. That is, because of certain redundancies in the sensors (redundancies in vehicle status calculations), the status of the rollover or potential for wheel lift may be confirmed with redundant estimates based on other sensors. Redundant estimates of a vehicle dynamic state may be calculated based on different combinations of the system sensors. If these estimates differ, a sensor failure can be identified. For example, if the Roll Controller indicates a wheel lift and the Wheel Lift Detector does not confirm lift, a Roll Control sensor failure can be identified. Also, the system may also be used to confirm (by confirmation signal) or determine a suspected fault in the sensors that are used to determine wheel lift. That is, if all indications except for one sensor indicate the vehicle has all four wheels in contact, then the sensor in question may be factored out of consideration or if necessary the system can be shutdown and the driver notified of the malfunction.

While particular embodiments of the invention have been shown and described, numerous variations alternate embodiments will occur to those skilled in the art. Accordingly, it is intended that the invention be limited only in terms of the appended claims.

What is claimed is:

1. A method for determining wheel lift of a wheel of an automotive vehicle comprising the steps of:
   modifying a steering angle of the wheel from a first position to a second position;
   monitoring an amount of steering effort during the step of modifying;
   comparing the amount of steering effort to a lift threshold;
   when the amount of steering effort is less than a lift threshold, indicating wheel lift.

2. A method as recited in claim 1 wherein said lift threshold is speed dependent.

3. A method as recited in claim 1 further comprising the step of returning the steering angle of the wheel to the second position after the step of monitoring.

4. A method as recited in claim 1 wherein said amount of steering effort is a function of actuator current.

5. A method as recited in claim 1 wherein said amount of steering effort is a function of hydraulic pressure.

6. A method as recited in claim 1 further comprising, after the step of indicating a wheel lift, applying a force to counter the wheel lift.

7. A method as recited in claim 1 wherein the step of modifying a steering angle comprises applying a steering perturbation having a predetermined amplitude for a predetermined time.

8. A method for controlling a rollover of an automotive vehicle having a plurality of wheels comprising the steps of:
   determining a potential for wheel lift;
   measuring the loads of the plurality of wheels;
   identifying one of the plurality of wheels as a lightly loaded wheel;
   applying a steering wheel angle change to the lightly loaded wheel;
   monitoring a steering effort during the step of applying a steering wheel angle change;
   when the steering effort of the lightly loaded wheel is less than a lift threshold, indicating wheel lift;
   in response to indicating wheel lift, applying a force to counter rollover.

9. A method as recited in claim 8 wherein said force is a steering force.

10. A method as recited in claim 8 wherein said force is a brake force.

11. A method as recited in claim 8 wherein the step of applying a steering wheel angle changed comprises the step of increasing a path of rotation of the vehicle.

12. A method as recited in claim 8 wherein the potential for wheel lift is a function of vehicle velocity, steering wheel angle and actuator position.

13. A method as recited in claim 8 wherein the steering wheel angle change has a predetermined amplitude for a predetermined time.

14. A method as recited in claim 8 wherein effort is a function of actuator current.

15. A method as recited in claim 8 wherein said effort is a function of hydraulic pressure.

16. A method as recited in claim 8 wherein said lift threshold is speed dependent.

17. An automotive vehicle system comprising:
   a first steering actuator;
   an actuator sensor generating a steering effort signal corresponding to an amount of steering effort; and,
   a controller coupled to said steering actuator and said actuator sensor for modifying a steering angle of the wheel from a first position to a second position, monitoring said steering effort signal while modifying the steering angle, and when the effort signal is less than a lift threshold said controller indicating wheel lift.

18. A system as recited in claim 17 further comprising a second steering actuator and a second actuator sensor generating a second steering effort signal.

19. A system as recited in claim 18 wherein said controller is coupled to said second steering actuator and said second actuator position sensor, said controller measuring loads of the first steering actuator and the second steering actuator and identifying a lightly loaded wheel.

20. A system as recited in claim 17 further comprising a plurality of wheel lift determination sensors, said controller generating a confirmation signal in response to a failure of one of said plurality of wheel lift determination sensors.

* * * * *